Oct. 12, 1954 P. F. BOEYE ET AL 2,691,480
BATTERY BOX
Filed April 2, 1953
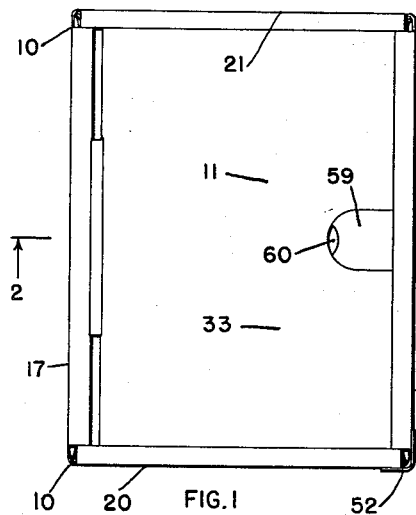
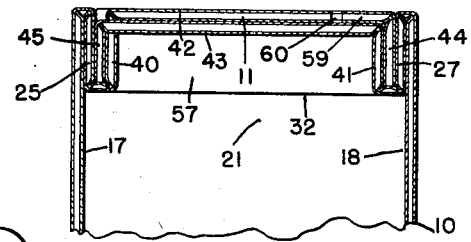
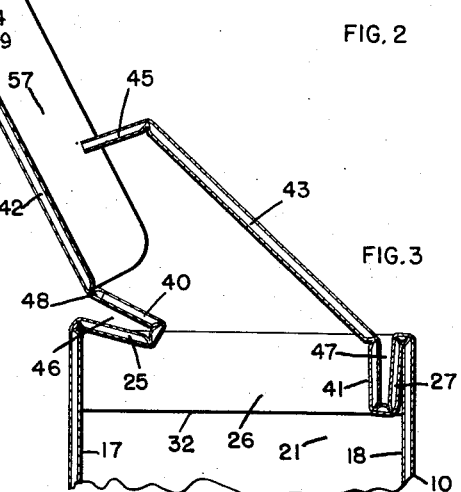
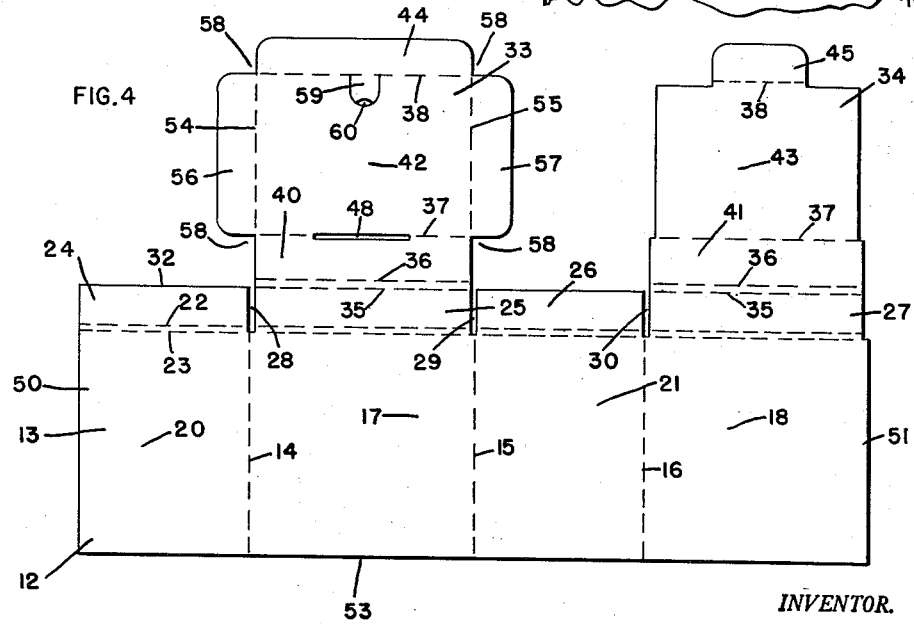
INVENTOR.
PAUL F. BOEYE AND
BY SAMUEL BRIGHT
Caswell & Lagaard
ATTORNEYS Patented Oct. 12, 1954

2,691,480

UNITED STATES PATENT OFFICE 2,691,480

BATTERY BOX

Paul F. Boeye and Samuel Bright, Minneapolis, Minn.

Application April 2, 1953, Serial No. 346,441

5 Claims. (Cl. 229—44)

The herein disclosed invention relates to boxes and particularly to boxes for shipping heavy articles such as storage batteries, and has for an object to provide a construction by means of which appreciable weight may be placed upon the top of the box.

Another object of the invention resides in providing a box in which the terminals of the battery are fully protected.

A still further object of the invention resides in providing a box which may be collapsed.

Another object of the invention resides in providing a box having a closure made of two cover members overlying one another and with flange structures connected to the upper walls of the box and to the top members for engagement with the case of the battery to protect the terminals of the battery.

A feature of the invention resides in providing a box for the purpose constructed of a single sheet of material.

A still further object of the invention resides in constructing the box with side and end walls and in forming on either the side or end walls flanges adapted to extend into the box and lying along the walls from which they issue, and other flanges extending upwardly therefrom and spaced to form upwardly opening pockets therebetween and in further forming cover members issuing from the upper ends of the second named flanges and having flaps thereon received in the pockets between said flanges.

Another object of the invention resides in constructing the second named flange of the uppermost cover member with a slot through which the flap on the lowermost cover member extends.

Other objects of the invention reside in the novel combination and arrangement of parts and in the details of construction hereinafter illustrated and/or described.

In the drawings:

Fig. 1 is a plan view of a box illustrating an embodiment of the invention.

Fig. 2 is a sectional view taken on line 2—2 of Fig. 1.

Fig. 3 is a view similar to Fig. 2 and showing the parts of the closure unassembled.

Fig. 4 is a developed view of the blank from which the box is constructed.

In the drawings a corrugated paper box has been shown for use in shipping storage batteries and consisting of a quadrilateral wall structure open at the top and bottom. This wall structure is collapsible by folding along the corners of the same. For closing the open upper end of the box, a closure is utilized which consists of two cover members connected to the side walls by pairs of flanges issuing therefrom and adapted to be folded over upon the inner surface of said walls and spaced to form upwardly opening pockets therebetween. The cover members have flaps issuing outwardly from the edges thereof and which are adapted to be received in the pockets between said flanges. The cover members are arranged one upon the other and the uppermost thereof is constructed with a slot in the innermost flange of the same and through which the flap of the undermost cover members extends. Other flanges are formed on the uppermost cover member and which lie along the inner surface of the ends of the box when the closure is assembled. A tab struck out of the uppermost cover member permits of opening the box without removing the same from the battery.

The invention consists of a quadrilateral wall structure 10 open at the top and bottom and adapted to be closed by means of a closure 11 integral with the wall structure 10. These parts are constructed from a single blank 12 shown in Fig. 4.

The blank 12 is constructed from a single sheet of corrugated board in which the corrugations run vertically with respect to the wall structure of the box. The wall structure 10 of the box is constructed from the lowermost portion 13 of the blank which is formed with scores 14, 15 and 16 and which divide the blank into side walls 17 and 18 and end walls 20 and 21. Near the upper part of the portion 13 of the blank, the same is formed with two closely spaced parallel horizontal scores 22 and 23 which form in the blank flanges 24, 25, 26 and 27. These flanges are separated from one another by means of cuts 28, 29 and 30 which extend from the outermost edges 32 of the flanges 24 and 26 to the score 23.

The blank 12 is constructed with two extensions 33 and 34 which extend outwardly from the flanges 25 and 27. These extensions are formed with longitudinally extending scores 35, 36, 37 and 38 which form in the said extensions flanges 40 and 41, cover members 42 and 43 and flaps 44 and 45. The scores 35 and 36 are spaced from one another a distance so that when the flange 40 is folded upon the flange 25 a pocket 46 is formed between the same, and likewise when the flange 41 is folded upon the flange 27 a pocket 47 is formed between the same. The flap 44 on the cover member 33 is of the full width of the flanges 25 and 40 while the flap 45 is considerably narrower and is adapted to extend through a slot 48 formed in the flange 40. The extension 33 is further formed with two vertical scores 54 and 55 which form in the blank flanges 56 and 57. These flanges are separated from the flanges 40 and 44 by notches 58 formed in the blank.

To permit of readily opening the closure whenever desired, a tab 59 is struck out of the cover member 33. This tab is formed with a notch 60 by means of which the same may be engaged with a finger to raise the said tab. Upon raising the cover member 33 the cover member 43 is made accessible. The edges of this cover member being exposed to either side of the flap 45, are readily accessible, and this cover member can be easily opened by engagement at such localities. However, if desired, a tab similar to the tab 59 may be formed in the cover member 43 at the locality of the flap 45 and which will serve the same purpose as the tab 59.

The marginal portions 50 and 51 of the walls 13 and 18 of wall structure 10 are secured together by means of a strip of tape 52 glued to the same and serving the usual purpose. The box in collapsed form is folded along the scores 14 and 16 and the parts then occupy a substantially planiform shape with the extensions 33 and 34 projected normally outwardly from the lowermost portion 13 of the blank.

When the box is to be erected, the walls 17, 18, 20 and 21 are shifted into rectangular position and set upon a table or other supporting structure with the lower edge 53 of the blank resting thereon. The flanges 24 and 26 are first folded into the interior of the box. The flange 25 is next folded inwardly into the box and the flange 40 folded upwardly therefrom to form the pocket 46. Similarly the flange 27 is folded inwardly into the box and the flange 41 caused to extend upward therefrom to form the pocket 47. Flap 45 is next folded inwardly and inserted into the slot 48 and caused to lie along the outer surface of the flange 40. The cover member 43 is next folded inwardly into the box until it assumes the position shown in Fig. 2 with the flap 45 lodged in the pocket 46. After these parts are in position, the flanges 56, 57 and 44 are folded inwardly and the flanges 56 and 57 caused to lie along the inner surfaces of the flanges 24 and 26 and the flange 44 to be received in the pocket 47.

The box illustrated has been shown without a bottom. Such construction has been found highly practical in the shipping of storage batteries since the only portions of the battery needing protection are the terminals which are fully protected by the super structure of the box.

The advantages of the invention are manifest. An extremely rigid super structure is formed in which the closure is constructed of two cover members. These members are attached to pairs of flanges which are spaced to form pockets therebetween and the said cover members are further formed with flaps which enter the pockets. Thus substantial engaging means for engagement with the upper end of the battery case are provided within the box having a width of three times the thickness of the corrugated board from which the box is constructed. Such construction permits of applying considerable weight to the top of the battery and will permit of stacking several batteries one upon the other. The box is of simple construction and is made from a single sheet of material thus making it unnecessary to assemble separate box sections when assembling the box. The corrugations run in a direction such that the greatest rigidity is given to the flanges in the direction of their height and the cover members are attached to the side walls of the box so that the span for the cover members is the minimum. The instant invention can be constructed on machinery now available for making paper boxes and at a nominal expense.

Changes in the specific form of the invention, as herein described, may be made within the scope of what is claimed without departing from the spirit of the invention.

Having described the invention, what is claimed as new and desired to be protected by Letters Patent is:

1. In a box having side and end walls and open at the top, flanges issuing outwardly from the upper ends of two of the opposite walls and overlying said walls upon the interior of the box, other flanges issuing from the lower edges of said first named flanges and extending upwardly therefrom and spaced from said flanges to form upwardly opening pockets therebetween, cover members issuing outwardly from the upper ends of said second named flanges, one of said cover members overlying the other and flaps formed on said cover members and received within said pockets.

2. In a box having side and end walls and open at the top, flanges issuing outwardly from the upper ends of two of the opposite walls and overlying said walls upon the interior of the box, other flanges issuing from the lower edges of said first named flanges and extending upwardly therefrom and spaced from said flanges to form upwardly opening pockets therebetween, cover members issuing outwardly from the upper ends of said second named flanges one of said cover members overlying the other, a flap formed on the uppermost cover member and received in the pocket between the flanges of the undermost cover member, the second named flange of the uppermost cover member having a slot therein and a flap on said undermost cover member extending through said slot and received in the pocket between the flanges of said uppermost cover member.

3. In a box having side and end walls and open at the top, flanges issuing outwardly from the upper ends of the side walls and extending into the box and overlying said walls upon the interior of the box, other flanges issuing from the lower edges of said first named flanges and extending upwardly therefrom and spaced from said first named flanges to form upwardly opening pockets therebetween, cover members issuing outwardly from the upper ends of said second named flanges, one of said cover members overlying the other and flaps formed on said cover members and received within said pockets.

4. In a box having side and end walls and open at the top, flanges issuing outwardly from the upper ends of two of the opposite walls and overlying said walls upon the interior of the box, other flanges issuing from the lower edges of said first named flanges and extending upwardly therefrom and spaced from said flanges to form upwardly opening pockets therebetween, cover members issuing outwardly from the upper ends of said second named flanges, one of said cover members overlying the other, flaps issuing from the edges of said cover members opposite said flanges from which said cover members issue and said flaps being received in said pockets.

5. In a box having side and end walls and open at the top, a flange issuing outwardly from the upper end of one of the walls of the box and overlying said wall upon the interior of the box, a second flange issuing from the lower edge of said first named flange and extending upwardly therefrom and spaced from said first named flange to form an upwardly opening pocket therebetween, a cover member issuing outwardly from the upper end of said second named flange and extending across the box toward the opposite wall thereof, a flap on said cover member issuing from the edge opposite the edge connected to said second named flange, a duplicate pair of flanges issuing outwardly from the upper end of the opposite wall of the box and forming a second upwardly opening pocket at said wall, a cover member issuing outwardly from the upper end of the second named flange of the duplicate pair of flanges and overlying said first named cover member, and a flap formed on the edge of said second named cover member opposite the flange from which it issues, said second named flap being received in said first named pocket and said first named flap being received in said second named pocket.

References Cited in the file of this patent

UNITED STATES PATENTS

| Number | Name | Date |
|---|---|---|
| 1,069,021 | Miller | July 29, 1913 |
| 2,444,895 | Ringler | July 6, 1948 |
| 2,649,238 | Brooks | Aug. 18, 1953 |

FOREIGN PATENTS

| Number | Country | Date |
|---|---|---|
| 784,254 | France | Apr. 29, 1935 |